(12) United States Patent
Pritzkau et al.

(10) Patent No.: US 11,349,713 B2
(45) Date of Patent: *May 31, 2022

(54) REAL-TIME CONFIGURATION CHECK FRAMEWORK

(71) Applicant: SAP SE, Walldorf (DE)

(72) Inventors: Eugen Pritzkau, Wiesloch (DE); Hartwig Seifert, Elchesheim-Illingen (DE); Kevin Schwab, Sandhausen (DE); Omar-Alexander Al-Hujaj, Bad Schönborn (DE); Volker Guzman, Heidelberg (DE); Wei-Guo Peng, Elztal (DE); Lin Luo, Rauenberg (DE); Harish Mehta, Wiesenbach (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,298

(22) Filed: Oct. 8, 2020

(65) Prior Publication Data

US 2021/0028986 A1  Jan. 28, 2021

Related U.S. Application Data

(63) Continuation of application No. 16/053,376, filed on Aug. 2, 2018, now Pat. No. 10,841,161.

(51) Int. Cl.
*H04L 41/0873* (2022.01)
*H04L 41/0893* (2022.01)
(Continued)

(52) U.S. Cl.
CPC ...... *H04L 41/0873* (2013.01); *G06F 9/44589* (2013.01); *G06F 21/64* (2013.01);
(Continued)

(58) Field of Classification Search
CPC . H04L 41/0873; H04L 41/0893; H04L 63/20; H04L 67/34; G06F 9/44589; G06F 21/64
See application file for complete search history.

(56) References Cited

U.S. PATENT DOCUMENTS

7,380,205 B2   5/2008  Bezrukov et al.
7,457,792 B2  11/2008  Weigt et al.
(Continued)

*Primary Examiner* — Azizul Choudhury
(74) *Attorney, Agent, or Firm* — Fish & Richardson P.C.

(57) ABSTRACT

A computer-implemented method receives a program code and a signature associated with the program code from a database persistency associated with an enterprise threat detection (ETD) system. The received program code is associated with a configuration check, and the configuration check is developed at a development computing system and can collect information associated with a computing system. The received program code and the signature associated with the program code is distributed to a plurality of computing systems that are monitored by the ETD system. At least one configuration check result is received, and the configuration check result is generated by executing the program code on the computing system. The at least one configuration check result then transmitted to the database persistence, and the at least one result is displayed on a database graphical user interface (GUI) associated with the database persistency.

20 Claims, 3 Drawing Sheets

(51) Int. Cl.
*G06F 9/445* (2018.01)
*H04L 67/00* (2022.01)
*G06F 21/64* (2013.01)
*H04L 9/40* (2022.01)

(52) U.S. Cl.
CPC .......... *H04L 41/0893* (2013.01); *H04L 63/20* (2013.01); *H04L 67/34* (2013.01)

(56) References Cited

U.S. PATENT DOCUMENTS

| | | |
|---|---|---|
| 7,457,793 B2 | 11/2008 | Weigt et al. |
| 7,457,794 B2 | 11/2008 | Weigt et al. |
| 7,624,092 B2 | 11/2009 | Lieske et al. |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,971,209 B2 | 6/2011 | Eberlein et al. |
| 8,051,034 B2 | 11/2011 | Mehta et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 9,037,678 B2 | 5/2015 | Mehta et al. |
| 9,075,633 B2 | 7/2015 | Nos |
| 9,116,906 B2 | 8/2015 | Nos et al. |
| 9,148,488 B2 | 9/2015 | Rabetge et al. |
| 9,223,972 B1 * | 12/2015 | Vincent ................ G06F 21/566 |
| 9,251,011 B2 | 2/2016 | Meier et al. |
| 9,304,978 B2 | 4/2016 | Bezrukov et al. |
| 9,348,665 B2 | 5/2016 | Storz et al. |
| 10,841,161 B2 | 11/2020 | Pritzkau et al. |
| 2004/0210891 A1 * | 10/2004 | Kouznetsov ............ G06F 21/64 717/168 |
| 2007/0028302 A1 * | 2/2007 | Brennan ................ H04L 63/14 726/24 |
| 2007/0136814 A1 | 6/2007 | Lee et al. |
| 2008/0250216 A1 | 10/2008 | Kershaw et al. |
| 2010/0132018 A1 | 5/2010 | Takala et al. |
| 2011/0113231 A1 * | 5/2011 | Kaminsky ............ G06F 21/575 713/2 |
| 2011/0265190 A1 | 10/2011 | Hsieh et al. |
| 2012/0159438 A1 | 6/2012 | Plate |
| 2013/0304665 A1 | 11/2013 | Rodeck et al. |
| 2013/0304666 A1 | 11/2013 | Rodeck et al. |
| 2013/0326079 A1 | 12/2013 | Seifert et al. |
| 2014/0098671 A1 * | 4/2014 | Raleigh ................ G06Q 20/40 370/235 |
| 2016/0365983 A1 | 12/2016 | Shahabuddin et al. |
| 2018/0351992 A1 * | 12/2018 | Lee ........................ H04L 63/00 |
| 2020/0044924 A1 | 4/2020 | Pritzkau et al. |

* cited by examiner

REAL-TIME CONFIGURATION CHECK FRAMEWORK

CLAIM OF PRIORITY

This application claims priority under 35 USC § 120 to U.S. patent application Ser. No. 16/053,376, filed on Aug. 2, 2018, titled "REAL-TIME CONFIGURATION CHECK FRAMEWORK"; the entire contents of which are hereby incorporated by reference.

BACKGROUND

Enterprise threat detection (ETD) typically collects and stores a large amount of log data from various systems associated with an enterprise computing system. The stored log data is usually analyzed using statistical and forensic-type data analysis tools to identify suspicious behavior in revealed patterns, trends, interactions, and associations. An appropriate response can then be taken if malicious behavior is suspected or identified. For customer enterprise computing systems running under different software releases and patch levels, there is a need, for example, when there is erroneous behavior or a security leak occurring under specific conditions, to check settings, particular configuration parameters in particular applications, or any other condition on the customer enterprise computing systems. If a threat to an enterprise computing system is found under a specific condition, it is often advantageous/necessary to find other enterprise computing systems meeting the specific condition criterion to permit a more comprehensive correction of the erroneous behavior or the security leak. However, checking each enterprise computing system manually is prohibitively time and resource intensive. In addition, especially in cases of security leaks, results of the configuration checks are typically needed urgently to mitigate and stop the security leaks.

SUMMARY

The present disclosure describes methods and systems, including computer-implemented methods, computer program products, and computer systems for distributing configuration checks and collecting the configuration check results in enterprise threat detection (ETD) systems.

In an implementation, a computer-implemented method executed by hardware processors can be performed. The example methods can comprise receives a program code and a signature from a database persistency associated with an ETD system. The received signature is associated with the received program code. The received program code is also associated with a configuration check, and the configuration check is developed at a development computing system and can collect information associated with a computing system. The received program code and the signature associated with the program code is distributed to a plurality of computing systems that are monitored by the ETD system. At least one configuration check result is received, and the configuration check result is generated by executing the program code on the computing system. At least one configuration check result is then transmitted to the database persistence, and the result is displayed on a database graphical user interface (GUI) associated with the database persistency.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, a disclosed configuration check framework allows an automatic and secure distribution of configuration checks and a collection of configuration check results to detect malware within computing systems. Under the described approach, a configuration check can be created in one development computing system by a developer and the same configuration check can be used in various computing systems for security inspection, saving cost and time on configuration check development. Second, automatic and secure distribution of configuration checks to connected computing systems, as well as collection and evaluation of configuration check results can be performed by the configuration check framework in real time (or in substantially real-time). As such, configuration checks within computing systems can be performed in real-time without system delay. Third, due to integration into ETD functionality, the configuration check results can be correlated with other entities like logs, alerts, or health checks for elaborated evaluation, for pattern creation and for alert notification, expanding the landscape of the usage of the created configuration checks.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes a real-time configuration check framework for real-time enterprise threat detection (ETD), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

ETD typically collects and stores large amounts/large sets of log data associated with various systems (often referred to as "big data") associated with an enterprise computing system. The stored data can be analyzed computationally using forensic-type data analysis tools to identify suspicious behavior and to allow an appropriate response.

At a high-level, the configuration check framework disclosed in this disclosure allows program code of a configuration check to be sent from a development computing system to an ETD database persistency. From the ETD database persistency, the configuration check is transmitted to a computing system using a data streaming service. The program code of the configuration check is inserted and executed in a computing system to generate configuration check results. The generated configuration check results are transmitted back to the ETD database persistency using the ETD SDS. The generated configuration check results can be shown, evaluated, and used within ETD detection patterns used to identify suspicious behavior on or between computing systems in a computing landscape integrated with ETD functionality. By using the described ETD functionality, configuration checks can be developed and distributed (for example, by software developers, network engineers, or computing system security engineers) to computing systems with ow resource (for example, development time, data storage, and analysis time) investments.

Conventionally, various methods can be used to deploy software into a customer system. For example, to obtain a new release or support package, the customer system needs to be upgraded or updated; to make a small correction (such as a SAP notes that are delivered by SAP before releasing the support package), the note needs to be implemented in the system. These methods can require considerable effort on the customer-side per system. For example, customers need to wait for a certain time for a new release or a new support package. Further, note implementation per system takes effort for landscapes with many systems. ETD can solve these problems by delivering configuration checks (which are implemented as system code modules) automatically into connected systems, which reduces, among other things, delivery delay and cost. For example, for new configuration checks that are correlated with security patches, ETD can frequently deliver configuration checks to be distributed in a customer system landscape without a need for frequent note implementations on the customer side.

In some implementations, the described configuration check framework can be configured to ensure that only valid program code is executed. For example, the program code (for example, code snippets) can be signed (that is, with a security-type signature) by a development computing system or ETD functionality on the ETD database persistency. The signature can be verified before the program code is executed on a computing system. In this way, the ability of a malicious actor to transmit harmful program code to other computing systems can be mitigated or prevented.

Figure 1:
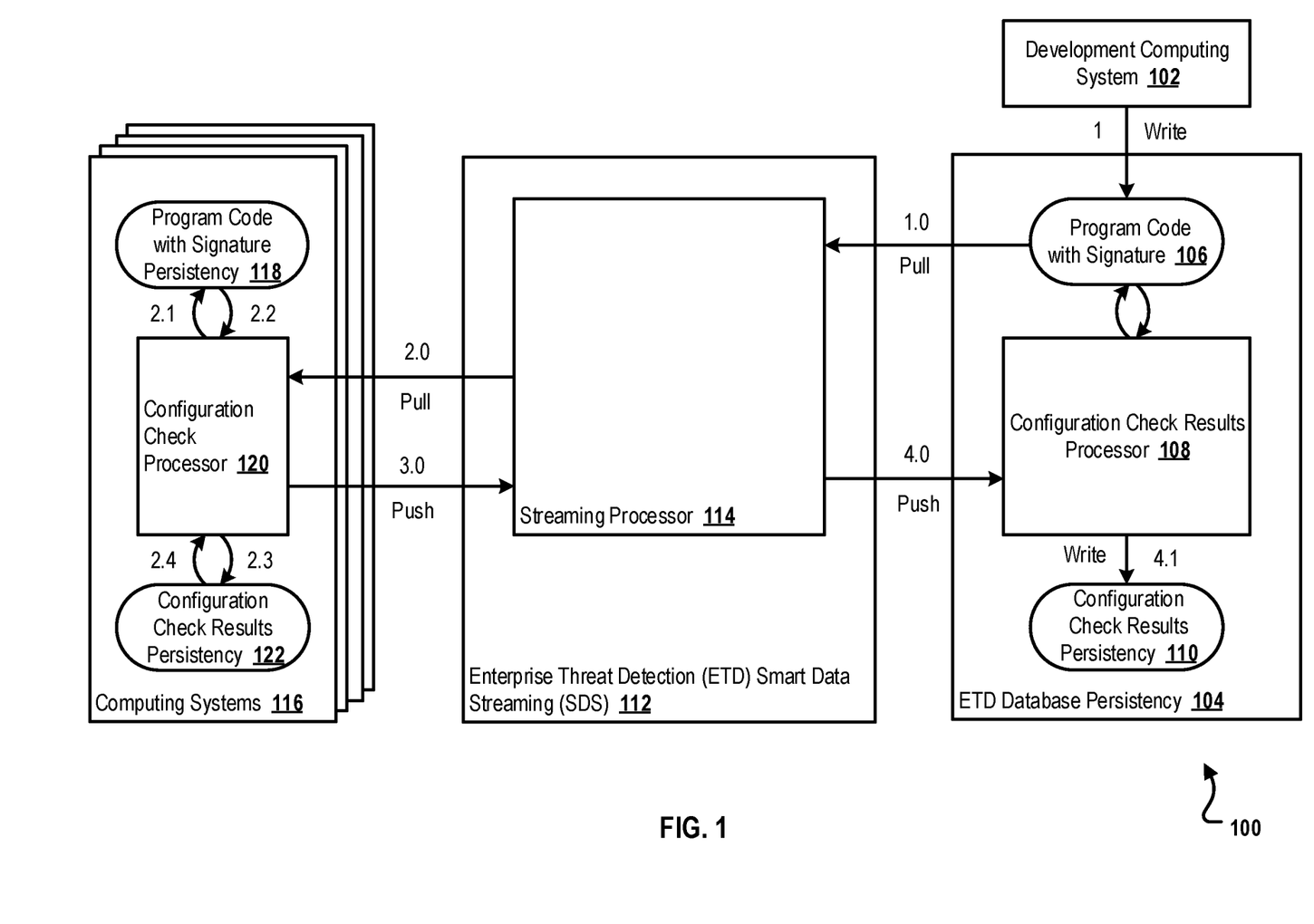
FIG. 1 is a block diagram illustrating component/data relationships for a real-time enterprise threat detection (ETD) configuration check framework, according to an implementation of the present disclosure.

FIG. 1 is a block diagram illustrating component/data relationship for a real-time ETD configuration check framework 100, according to an implementation of the present disclosure. FIG. 1 is provided for example purposes only to enhance understanding of the presented concepts. As will be appreciated for those of ordinary skill in the art, there is a myriad of possible ways to present or to arrange the presented components, to structure their interactions, or to describe inter/intra-component interactions/communications In as far as they are consistent with this disclosure, the other possible presentations or arrangements, structures, or descriptions are considered to be within the scope of this disclosure.

At high-level and in some implementations of the described real-time ETD configuration check framework 100, a Development Computing System 102 (for example, an SAP ABAP or JAVA development computing system) is used to create a configuration check for a computing system. In some implementations, individual software developers can analyze developed configuration check code on the Development Computing System 102 to ensure expected computing performance when configuration check program code is executed on a computing system. Note that numbers (for example, 1, 1.0, 2.0, and 3.0) associated with connecting arrows in FIG. 1 are used for referential purposes to demonstrate relationships between illustrated components.

The created configuration check is saved into an ETD Database Persistency 104 as Program Code 106 (for example, as code snippets). The ETD Database Persistency 104 (for example, an SAP HANA in-memory database) is a database that is connected to an ETD computing system. In some implementations, the Database Persistency 104 can store events, ETD detection patterns, and context about the users and computing systems in a computing system landscape. The stored information can be analyzed by ETD functionality using ETD detection patterns to generate alerts upon satisfaction of criteria specified in the ETD detection patterns.

As illustrated in FIG. 1, the ETD Database Persistency 104 includes a Configuration Check Results Processor 108. The Configuration Check Results Processor 108 is used to persist received Configuration Check Results into the ETD Database Persistency 104 (for example, into a Configuration Check Results Persistency 110) for analysis.

The ETD smart data streaming (SDS) 112 (for example, SAP HANA SDS) is one example of the previously described smart data streaming service. ETD SDS 112 can process streams of incoming event data in real-time collect, and act on the data. SDS can be used in situations where data arrives as events happen, and where there is value in collecting, analyzing/understanding, and acting on the data in a temporally proximate manner.

As illustrated in FIG. 1, A Streaming Processor 114 of the ETD SDS 112 can be used to pull the Program Code with Signature (Program Code) 106 from the ETD Database Persistency 104 (1.0) and into the ETD SDS 112 (2.0) for processing. The ETD SDS 112 can also push (3.0) Configuration Check Results back to the ETD Database Persistency 104 (4.0). While FIG. 1 illustrates "push" and "pull" (that is, 1.0, 2.0, 3.0, and 4.0), whether data is pushed or pulled within the real-time ETD configuration check framework 100 can be varied within the scope of this disclosure.

Computing Systems 116 (for example, SAP ABAP production systems) are computing systems monitored by the ETD. A Configuration Check Processor 120 of the Computing System 116 can be configured to pull (2.0) the Program Code 106 from the Streaming Processor 114. The pulled Program Code 106 can be stored in a Program Code with Signature Persistency 118.

The Computing Systems 116 include a Configuration Check Processor 120 to execute the Program Code 106. After the Program Code 106 is executed by the Configuration Check Processor 120, Configuration Check Results are generated. In some implementations, the Configuration Check Processor 120 can be configured to serialize a Configuration Check Result into a different format (for example, JAVASCRIPT OBJECT NOTATION (JSON)). The generated Configuration Check Results can be stored in a Configuration Check Results Persistency 122. The Configuration Check Processor 120 can be configured to push (3.0) Configuration Check Results back to the Streaming Processor 114 of the ETD SDS 112. The Streaming Processor 114 then pushes (4.0) the Configuration Check Results to the ETD Database Persistency 104.

Figure 2:
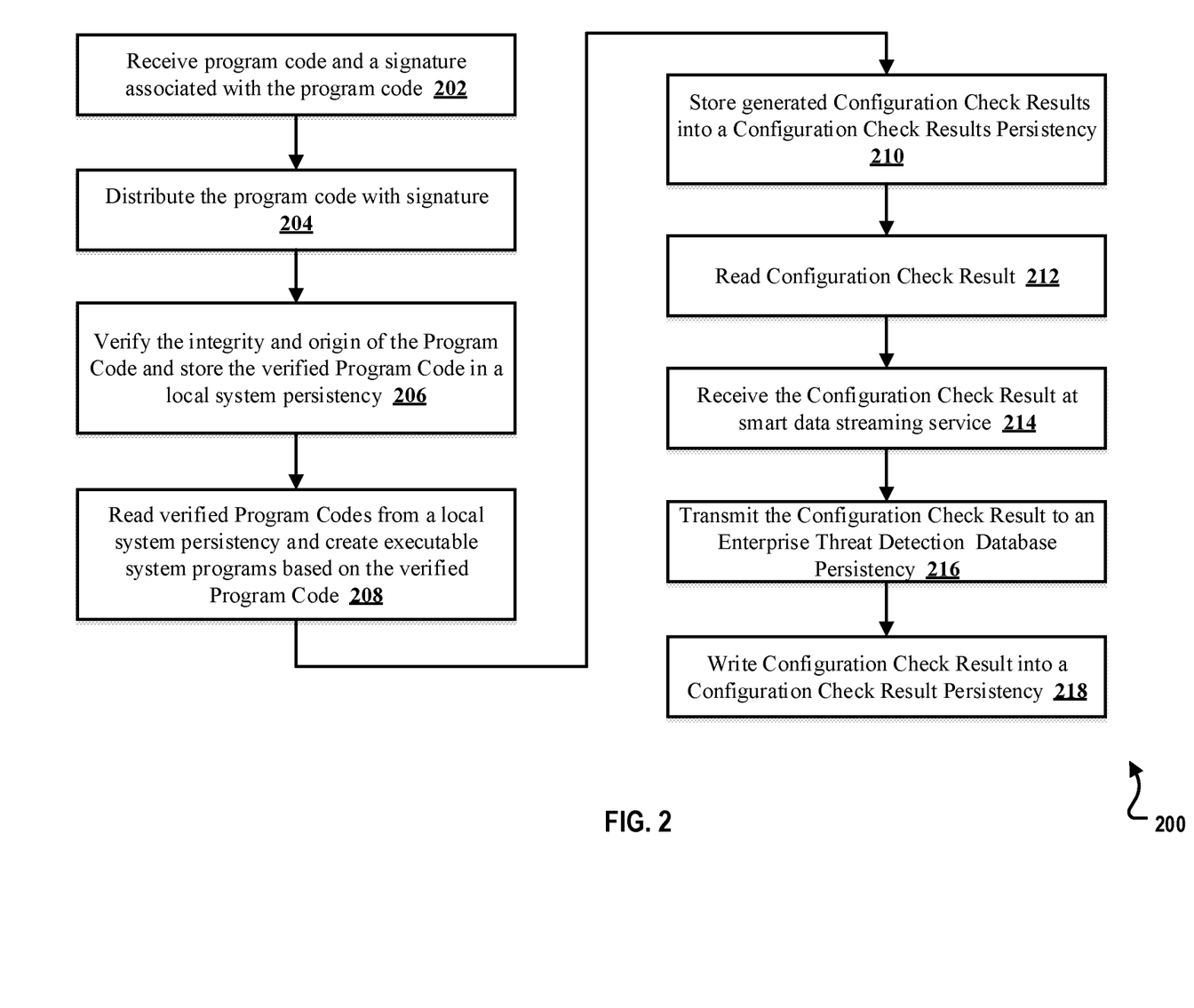
FIG. 2 is a flowchart of an example method for a real-time ETD configuration checks, according to an implementation of the present disclosure.

FIG. 2 is a flowchart of an example method 200 for a real-time ETD configuration checks, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, (1.0) Program Code with Signature (Program Code) 106 are received at an ETD SDS 112 from an ETD Database Persistency 104 associated with an ETD computing system. The received Program Code 106 is associated with a configuration check. The configuration check is developed on the Development Computing System 102 and can be used to collect information associated with a Computing System 116. For example, when there is abnormal behavior or a security leak detected or suspected in a computing system, particular configuration parameters in a particular application associated with a Computing System 116 can be checked. Then the according configuration check can be distributed to all affected systems. To add customer defined configurations checks, the customer can first choose a development system, and then create an executable program in the customer namespace. The program is intended to be deployed by ETD into all systems connected to the ETD. If a security leak or performance pitfall is detected in one system, then a corresponding configuration check used to detect the leak or performance pitfall is distributed to other connected systems to ensure that they are also not affected.

The developed configuration check can be distributed over an entire computing system landscape for automatic threat detection. In some implementations, the Development Computing System 102 can provide a user interface (for example, a graphical user interface (GUI)) for development of the configuration check. The configuration check can be saved as Program Code 106 on an ETD Database Persistency 104. In some implementations, the Development Computing System 102 can provide functionality to download the developed configuration check into the ETD Database Persistency 104.

In some implementations, when the developed configuration check is saved as Program Code 106 in the ETD Database Persistency 104, a signature associated with the Program Code 106 can also be created. In some implementations, the signature can be created on the Development Computing System 102 by a public-key secure store and forward (SSF) mechanism used to implement digital signature functionality. The SSF mechanism can be used by a computing system as an internal means to protect data in the computing system (such as, to digitally sign and encrypt documents or to secure data integrity, authenticity, and confidentiality). By using the SSF functionality, a developer can "wrap" the Program Code 106 before distribution over insecure communication links.

Once both the Program Code 106 are created and saved in the ETD Database Persistency 104, a Streaming Processor 114 of the ETD SDS 112 pulls the Program Code 106 from the ETD Database Persistency 104 to the ETD SDS 112. For reasons of simplicity, in FIG. 1 a corresponding arrow (1.0) indicates Program Code 106 pulled to the ETD SDS 112 from the ETD Data Persistency 104. From 202, method 200 proceeds to 204.

At 204, (2.0) the Program Code 106 is distributed over the ETD system to a plurality of Computing Systems 116 monitored by the ETD system. In some implementations, the Program Code 106 can be distributed to Computing Systems 106 by transmitting the Program Code 106 to a Configuration Check Processor 120 executing on each of the Computing Systems 116. In some implementations, more than one Configuration Check Processor 120 can be executing on a particular Computing System 116. From 204, method 200 proceeds to 206.

At 206, (2.1) integrity and origin of the Program Code 106 is verified with the signature associated with the Program Code 106 by the Configuration Check Processor 120. The verification ensures that the content of the Program Code 106 is unchanged and that the Program Code 106 is provided by an owner of the signature. The verified Program Code is stored into a local system persistency (that is, a Program Code with Signature Persistency 118). In some implementations, the signature can be verified by the SSF mechanism that is used to create the signature. From 206, method 200 proceeds to 208.

At 208, (2.2) the verified Program Code 106 is read by the Configuration Check Processor 120 from the Program Code with Signature Persistency 118 and an associated executable program is created from the Program Code 106. The associated executable program is executed by the Configuration Check Processor 120 to generate Configuration Check Results. From 208, method 200 proceeds to 210.

At 210, (2.3) the generated Configuration Check Results are stored into the Configuration Check Results Persistency 122. From 210, method 200 proceeds to 212.

At 212, (2.4) the Configuration Check Results are read by the Configuration Check Processor 120 and formatted to be transmitted and reconstructed (for example, structured data associated with the Configuration Check Results can be serialized into a JSON format). In some implementations, a corresponding deserialization process can be used by the ETD Database Persistency 104. From 212, method 200 proceeds to 214.

At 214, (3.0) the Configuration Check Result is received at the ETD SDS 112. In some implementations, the Configuration Check result is received at the ETD SDS 112 by the Configuration Check Processor 120 pushing the Configuration Check Results to the Streaming Processor 114. Specifically, on each system, a background process executes configuration checks, serializes the result into JSON format, and pushes the results using HTTP(S) to the ETD SDS 112. From 214, method 200 proceeds to 216.

At 216, (4.0) the received Configuration Check Result is transmitted to the ETD Database Persistency 104. In some implementations, the Configuration Check Result is transmitted to the ETD Database Persistency 104 by the ETD SDS 112 pushing the Configuration Check Results into the Configuration Check Results Processor 108 of the ETD Database Persistency 104. From 216, method 200 proceeds to 218.

At 218, (4.1) the Configuration Check Result is written into the Configuration Check Results Persistency 110 by the Configuration Check Results Processor 108. In some implementations, the Configuration Check Result then can be displayed on and analyzed with a GUI. After 218, method 200 stops.

Figure 3:
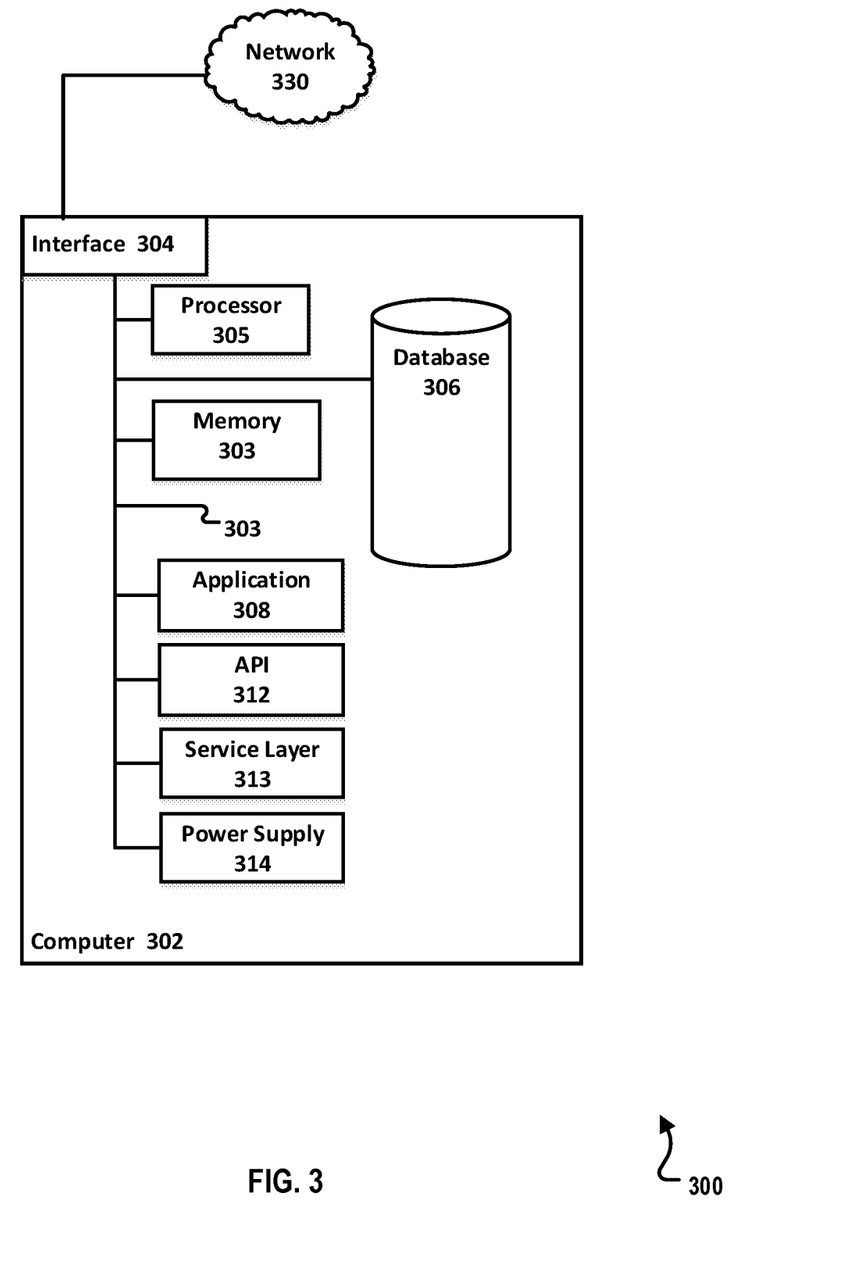
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 302 can include an input device, such as a keypad, keyboard, touch screen, another input device, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as a client, network component, a server, a database or another persistency, another role, or a combination of roles for performing the subject matter described in the present disclosure. The illustrated Computer 302 is communicably coupled with a Network 330. In some implementations, one or more components of the Computer 302 can be configured to operate within an environment, including cloud-computing-based, local, global, another environment, or a combination of environments.

At a high level, the Computer 302 is an electronic computing device operable to receive, transmit, process, store, or manage data and information associated with the described subject matter. According to some implementations, the Computer 302 can also include or be communicably coupled with a server, including an application server, e-mail server, web server, caching server, streaming data server, another server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory, conventional, or another type of database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: receiving, from a database persistency associated with an enterprise threat detection (ETD) system, a program code and a signature associated with the program code, wherein the program code is associated with a configuration check, and wherein the configuration check is developed at a development computing system and can collect information associated with a computing system; distributing the program code and the signature associated with the program code to a plurality of computing systems, wherein the plurality of computing systems are monitored by the ETD system; receiving at least one configuration check result, wherein the configuration check result is generated by executing the program code on the computing system; and transmitting the at least one configuration check result to the database persistency, wherein the at least one configuration check result is displayed on a graphical user interface (GUI) associated with the database persistency.

The foregoing and other described implementations can each, optionally, include one or more of the following features:

A first feature, combinable with any of the following features, further comprising creating a signature at a data persistency; and wherein the signature is associated with an integrity and an origin of the program code.

A second feature, combinable with any of the previous or following features, wherein distributing the program code and the signature associated with the program code to a plurality of computing systems comprises transmitting the program code and the signature associated with the program code to a system configuration check processor executing on each of the plurality of computing systems.

A third feature, combinable with any of the previous or following features, wherein executing the program code on the computing system comprises: verifying the signature with a system configuration check processor associated with the computing system; storing, at a local persistency associated with the computing system, the program code and the verified signature; creating an executable system program with the system configuration check processor by reading the stored program code from the local persistency; and executing the program code by running the created system program.

A fourth feature, combinable with any of the previous or following features, further comprising transmitting the configuration check result from the computing system.

A fifth feature, combinable with any of the previous or following features, wherein the configuration check result is serialized into a request by the system configuration check processor.

A sixth feature, combinable with any of the previous or following features, wherein displaying the configuration check results comprises: writing the received configuration check results into the database persistency with a database configuration check results processor associated with the database persistency; and displaying the configuration check results on the database GUI.

In a second implementation, a non-transitory, computer-readable medium storing one or more instructions executable by a computer system to perform operations comprising: receiving, from a database persistency associated with an enterprise threat detection (ETD) system, a program code and a signature associated with the program code, wherein the program code is associated with a configuration check, and wherein the configuration check is developed at a development computing system and can collect information associated with a computing system; distributing the program code and the signature associated with the program code to a plurality of computing systems, wherein the plurality of computing systems are monitored by the ETD system; receiving at least one configuration check result, wherein the configuration check result is generated by executing the program code on the computing system; and transmitting the at least one configuration check result to the database persistency, wherein the at least one configuration check result is displayed on a graphical user interface (GUI) associated with the database persistency.

The foregoing and other described implementations can each, optionally, include one or more of the following features:

A first feature, combinable with any of the following features, further comprising one or more instructions to create a signature at a data persistency; and wherein the signature is associated with an integrity and an origin of the program code.

A second feature, combinable with any of the previous or following features, wherein distributing the program code and the signature associated with the program code to a plurality of computing systems comprises transmitting the program code and the signature associated with the program code to a system configuration check processor executing on each of the plurality of computing systems.

A third feature, combinable with any of the previous or following features, wherein executing the program code on the computing system comprises one or more instructions to: verify the signature with a system configuration check processor associated with the computing system; store, at a local persistency associated with the computing system, the program code and the verified signature; create an executable system program with the system configuration check processor by reading the stored program code from the local persistency; and execute the program code by running the created system program.

A fourth feature, combinable with any of the previous or following features, further comprising one or more instructions to transmit the configuration check result from the computing system.

A fifth feature, combinable with any of the previous or following features, wherein the configuration check result is serialized into a request by the system configuration check processor.

A sixth feature, combinable with any of the previous or following features, wherein displaying the configuration check results comprises one or more instructions to: write the received configuration check results into the database persistency with a database configuration check results processor associated with the database persistency; and display the configuration check results on the database GUI.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, from a database persistency associated with an enterprise threat detection (ETD) system, a program code and a signature associated with the program code, wherein the program code is associated with a configuration check, and wherein the configuration check is developed at a development computing system and can collect information associated with a computing system; distributing the program code and the signature associated with the program code to a plurality of computing systems, wherein the plurality of computing systems are monitored by the ETD system; receiving at least one configuration check result, wherein the configuration check result is generated by executing the program code on the computing system; and transmitting the at least one configuration check result to the database persistency, wherein the at least one configuration check result is displayed on a graphical user interface (GUI) associated with the database persistency.

The foregoing and other described implementations can each, optionally, include one or more of the following features:

A first feature, combinable with any of the following features, further comprising one or more operations to create a signature at a data persistency; and wherein the signature is associated with an integrity and an origin of the program code.

A second feature, combinable with any of the previous or following features, wherein distributing the program code and the signature associated with the program code to a plurality of computing systems comprises transmitting the program code and the signature associated with the program code to a system configuration check processor executing on each of the plurality of computing systems.

A third feature, combinable with any of the previous or following features, wherein executing the program code on the computing system comprises one or more operations to: verify the signature with a system configuration check processor associated with the computing system; store, at a local persistency associated with the computing system, the program code and the verified signature; create an executable system program with the system configuration check processor by reading the stored program code from the local persistency; and execute the program code by running the created system program.

A fourth feature, combinable with any of the previous or following features, further comprising one or more operations to transmit the configuration check result from the computing system.

A fifth feature, combinable with any of the previous or following features, wherein the configuration check result is serialized into a request by the system configuration check processor.

A sixth feature, combinable with any of the previous or following features, wherein displaying the configuration check results comprises one or more operations to: write the received configuration check results into the database persistency with a database configuration check results processor associated with the database persistency; and display the configuration check results on the database GUI.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, by a computing system, program code and a signature associated with the program code, wherein the computing system is monitored by an enterprise threat detection (ETD) system and the program code is associated with a configuration check of the computing system;
verifying the signature associated with the program code with a system configuration check processor associated with the computing system;
storing, at a local persistency associated with the computing system, the program code and the signature associated with the program code;

creating an executable system program with the system configuration check processor by reading the program code from the local persistency;

executing the program code by running the executable system program to generate at least one configuration check result; and transmitting the at least one configuration check result to a database persistency, wherein the at least one configuration check result is displayed on a graphical user interface (GUI) associated with the database persistency.

2. The computer-implemented method of claim 1, further comprising creating a signature at a data persistency, wherein the signature is associated with integrity of the program code and an origin of the program code.

3. The computer-implemented method of claim 1, wherein distributing the program code and the signature associated with the program code to a plurality of computing systems comprises transmitting the program code and the signature associated with the program code to the system configuration check processor executing on each of the plurality of computing systems.

4. The computer-implemented method of claim 1, wherein the configuration check is developed at a development computing system and collects information associated with the computing system.

5. The computer-implemented method of claim 1, further comprising transmitting the at least one configuration check result from the computing system.

6. The computer-implemented method of claim 5, wherein the at least one configuration check result is serialized into a request by the system configuration check processor.

7. The computer-implemented method of claim 1, wherein displaying the at least one configuration check result comprises:

writing the at least one configuration check result into the database persistency with a database configuration check results processor associated with the database persistency; and displaying the at least one configuration check result on the GUI.

8. A non-transitory, computer-readable medium storing one or more instructions executable by a computer system to perform operations comprising:

receiving, by a computing system, program code and a signature associated with the program code, wherein the computing system is monitored by an enterprise threat detection (ETD) system and the program code is associated with a configuration check of the computing system;

verifying the signature associated with the program code with a system configuration check processor associated with the computing system;

storing, at a local persistency associated with the computing system, the program code and the signature associated with the program code;

creating an executable system program with the system configuration check processor by reading the program code from the local persistency;

executing the program code by running the executable system program to generate at least one configuration check result; and transmitting the at least one configuration check result to a database persistency, wherein the at least one configuration check result is displayed on a graphical user interface (GUI) associated with the database persistency.

9. The non-transitory, computer-readable medium of claim 8, further comprising creating a signature at a data persistency, wherein the signature is associated with an integrity of the program code and an origin of the program code.

10. The non-transitory, computer-readable medium of claim 8, wherein distributing the program code and the signature associated with the program code to a plurality of computing systems comprises transmitting the program code and the signature associated with the program code to the system configuration check processor executing on each of the plurality of computing systems.

11. The non-transitory, computer-readable medium of claim 8, wherein the configuration check is developed at a development computing system and collects information associated with the computing system.

12. The non-transitory, computer-readable medium of claim 8, further comprising one or more instructions to transmit the at least one configuration check result from the computing system.

13. The non-transitory, computer-readable medium of claim 12, wherein the at least one configuration check result is serialized into a request by the system configuration check processor.

14. The non-transitory, computer-readable medium of claim 8, wherein displaying the at least one configuration check result comprises one or more instructions to:

write the at least one configuration check result into the database persistency with a database configuration check results processor associated with the database persistency; and display the at least one configuration check result on the GUI.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving program code and a signature associated with the program code, wherein the computer-implemented system is monitored by an enterprise threat detection (ETD) system and the program code is associated with a configuration check of the computer-implemented system;

verifying the signature associated with the program code with a system configuration check processor associated with the computer-implemented system;

storing, at a local persistency associated with the computer-implemented system, the program code and the signature associated with the program code;

creating an executable system program with the system configuration check processor by reading the program code from the local persistency;

executing the program code by running the executable system program to generate at least one configuration check result; and transmitting the at least one configuration check result to a database persistency, wherein the at least one configuration check result is displayed on a graphical user interface (GUI) associated with the database persistency.

16. The computer-implemented system of claim 15, further comprising one or more operations to create a signature at a data persistency, wherein the signature is associated with an integrity of the program code and an origin of the program code.

17. The computer-implemented system of claim 15, wherein distributing the program code and the signature associated with the program code to a plurality of computing systems comprises transmitting the program code and the signature associated with the program code to the system configuration check processor executing on each of the plurality of computing systems.

18. The computer-implemented system of claim 15, wherein the configuration check is developed at a development computing system and collects information associated with the computer-implemented system.

19. The computer-implemented system of claim 18, wherein the at least one configuration check result is serialized into a request by the system configuration check processor.

20. The computer-implemented system of claim 15, wherein displaying the at least one configuration check result comprises one or more operations to:
- write the at least one configuration check result into the database persistency with a database configuration check results processor associated with the database persistency; and
- display the at least one configuration check result on the GUI.

* * * * *